Patented Jan. 7, 1930

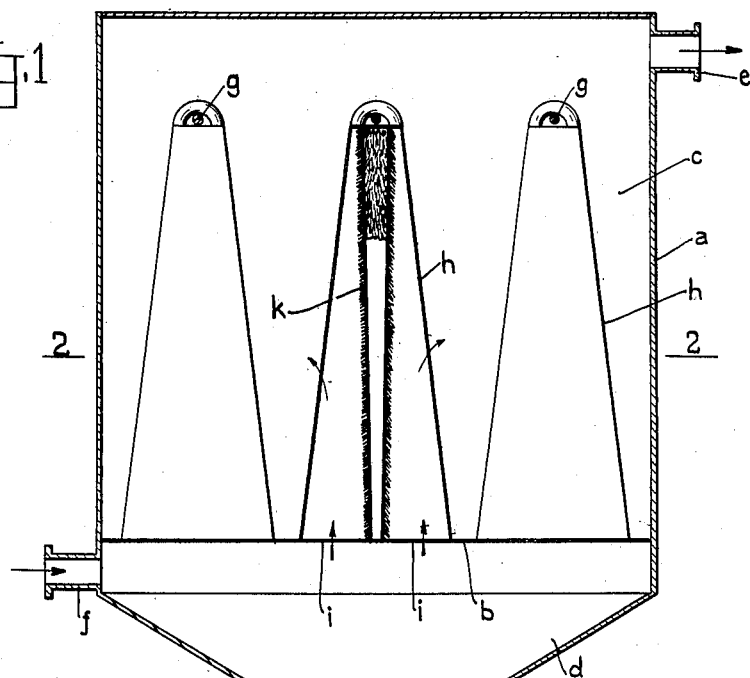
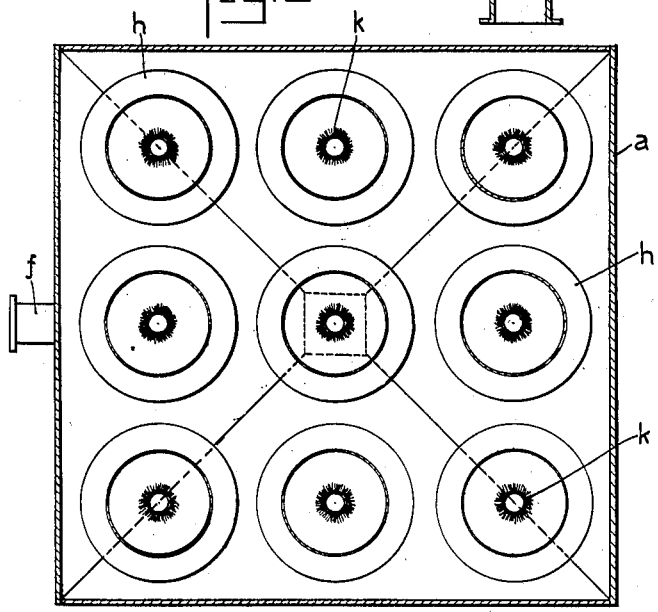
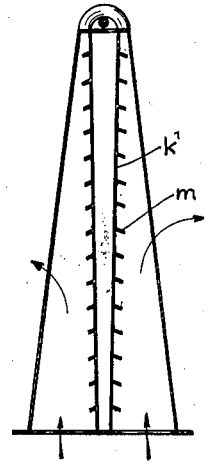

1,743,050

UNITED STATES PATENT OFFICE

EDUARD WILHELM STRAUS, OF LUBECK, GERMANY

AIR FILTER

Application filed February 12, 1926, Serial No. 88,018, and in Germany February 13, 1925.

My said invention relates to improvements in air filters such as are used for purifying air or gas by removal of dust and other impurities. More particularly my invention relates to filters of that type in which upright closed tubes or sleeves are arranged in a closed chamber in such fashion that the air or gas to be purified enters them at the bottom and passes out through the walls of such tubes or sleeves, the dust being deposited on the inner surfaces of the filtering members and being removed from time to time by beating, shaking or folding them, or by means of a countercurrent of air or gas. Commonly the purified air or gas is drawn through the filtering members by means of suction which creates a partial vacuum in the chamber, but the air or gas may be forced through under pressure.

Referring to the drawings, which are made a part hereof, and in which similar reference characters indicate similar parts;

Fig. 1 is a vertical section of a preferred form of my invention,

Fig. 2, a section of the same on line 2—2 of Fig. 1, and

Fig. 3, a section of a filter of modified form.

In the drawings reference character $a$ indicates the outer casing having a main chamber $c$, a lower chamber $d$, an inlet at $f$, an outlet at $e$, and a vent at the bottom through which the collected dust may be removed. A floor or partition $b$ supports the filtering elements in the main chamber $c$. The outer elements consist of cylindrical or conical sleeves suspended on horizontal bars in the chamber $c$, or otherwise suitably supported, and so arranged as to cover holes $i$ in the floor or partition $b$.

The outer sleeves are made of permeable texture and they surround inner elements $k$ which preferably taper downwardly, as clearly shown in Fig. 1. To produce the best results the inner filtering elements are made of impermeable material with a rough surface, e. g., wooly or hairy. As here shown they are in the form of inverted conical, or rather frusto-conical, sleeves and are united in such a manner that the intermediate space is closed above and below except for the ports $i, i$ for the admission of air or gas.

The air which is to be cleansed travels in the direction of the arrows and deposits a large part of its contained dust on the rough surface of the inner sleeve, thus relieving the outer filtering sleeve of a corresponding part of its duty. The purified air passes through the outer sleeve. The downward taper of the inner sleeve is of great importance in that this enhances the dust-removing action due to the intimate contact of the air with the rough surface of that member affording a large area of contact in an advantageous position. The roughened inner sleeve by reason of its dust-arresting surface, projections, etc., removes a considerable part of the solid particles of dust or the like from the air or other gas being treated and thus serves to permit longer use of the outer sleeve as a screen before it has to be cleaned, or if that sleeve is beaten or otherwise treated to remove the accumulated dust, then such treatments may be less frequent than would otherwise be the case. The arrest of dust particles by the inner sleeve may cause them to fall back to the bottom of the chamber $d$, or fine dust may collect until it drops off in masses heavy and large enough to do the same. The tapered form of the inner sleeve, when employed, affords a sort of overhang which increases the effectiveness of the device.

Instead of the inner sleeve with a rough surface it is also feasible to use a similar cone of material such as sheet iron, as in Fig. 3 at $k'$, with one or more outward projections of spiral or annular or wing shape. Such projections may be staggered or otherwise suitably arranged. With such an arrangement some of the dust will be removed by a rebounding action. Such dust may collect in the lower chamber $d$ and be removed at appropriate times, and the shaking, beating, etc., for removal of dust from the elements $k$ and $h$ may be performed in any suitable or conventional manner.

Obviously the invention may be embodied in other forms, as with an outer member in the form of a pocket, in which case the inner member may take the form of a wedge with its smaller end at the bottom. Many other variations will occur to those skilled in the art and therefore I do not limit myself to the particular form of the invention shown in the drawings and described in the specification, but only as indicated in the appended claims.

Having thus fully described my said invention, what I claim and desire to secure by Letters Patent is:

1. A filter for air and other gases comprising a casing, a partition extending transversely thereof said partition having ports, an inlet below the partition, an outlet above the partition, one or more filtering elements extending upward about ports in said partition, an inner impermeable member substantially concentric with the filtering element and having an outer dust-arresting surface, and means below the partition for collecting and discharging from the casing accumulated solids discharged through said ports in cleaning the filter.

2. An air filter characterized by the combination of two filtering members, between which the dusty air passes and consisting of an outer permeable filtering fabric and an inner impermeable member having a dust arresting and holding rough outer surface.

3. In an air filter, an outer tube of permeable filtering fabric, an inner impermeable tube having a rough dust collecting surface and forming with the outer tube a ring-shaped channel closed at one end, through which the dusty air flows so as to pass through said filtering fabric and leave the dust at the inner side of the fabric and at the rough outside of the impermeable tube.

In testimony whereof I have affixed my signature.

EDUARD WILHELM STRAUS.